United States Patent
Ilardo et al.

(10) Patent No.: US 9,909,342 B2
(45) Date of Patent: Mar. 6, 2018

(54) SAFETY DEVICE FOR VEHICLE DOOR HANDLE

(71) Applicant: VALEO S.p.A., Santena (IT)

(72) Inventors: Simone Ilardo, Pianezza (IT); Vittorio Giaccone, Pianezza (IT)

(73) Assignee: VALEO S.p.A., Santena (IT)

( * ) Notice: Subject to any disclaimer, the term of this patent is extended or adjusted under 35 U.S.C. 154(b) by 568 days.

(21) Appl. No.: 14/415,158

(22) PCT Filed: Jul. 18, 2013

(86) PCT No.: PCT/EP2013/065251
§ 371 (c)(1),
(2) Date: Jan. 16, 2015

(87) PCT Pub. No.: WO2014/013040
PCT Pub. Date: Jan. 23, 2014

(65) Prior Publication Data
US 2015/0191942 A1  Jul. 9, 2015

(30) Foreign Application Priority Data
Jul. 18, 2012  (EP) .................................. 12425126

(51) Int. Cl.
*E05B 3/00* (2006.01)
*E05B 77/06* (2014.01)
(Continued)

(52) U.S. Cl.
CPC ............ *E05B 77/06* (2013.01); *B23P 19/048* (2013.01); *E05B 77/42* (2013.01); *E05B 85/16* (2013.01);
(Continued)

(58) Field of Classification Search
CPC .......... E05B 77/02; E05B 77/06; E05B 77/04; E05B 77/42; E05B 2015/0431;
(Continued)

(56) References Cited

U.S. PATENT DOCUMENTS 6,422,616 B1    7/2002   Wortmann et al.
2005/0194791 A1  9/2005   Udriste et al.
(Continued)

FOREIGN PATENT DOCUMENTS

DE   10 2009 058 751 A1   5/2011
DE   10 2009 058 750 A1   6/2011
(Continued)

OTHER PUBLICATIONS

International Search Report for corresponding International Application No. PCT/EP2013/065251, dated Oct. 16, 2013 (5 pages).

*Primary Examiner* — Alyson M Merlino
(74) *Attorney, Agent, or Firm* — Osha Liang LLP

(57) ABSTRACT

An inertial system for a vehicle door handle of a door includes an inertial mass driven by inertia from a rest position in which opening of the door is permitted to a blocking position in which opening of the door is not permitted, a blocking means that prevents opening of the door when the inertial mass is in the blocking position. The inertial system also includes an elastic means being in a minimal tensile stress state when the inertial mass is in rest position and applies a force on the inertial mass to bring the inertial mass from the blocking position to the rest position and a preloading mechanism that cooperates with the elastic means and includes at least two preloading states for enabling the elastic means to have different minimal tensile stress states.

19 Claims, 3 Drawing Sheets

(51) Int. Cl.
  *E05B 77/42* (2014.01)
  *B23P 19/04* (2006.01)
  *E05B 85/16* (2014.01)
  *E05B 15/04* (2006.01)

(52) U.S. Cl.
  CPC ... *E05B 2015/0431* (2013.01); *Y10T 29/4987* (2015.01); *Y10T 292/57* (2015.04)

(58) Field of Classification Search
  CPC .. E05B 2015/0441; E05B 85/14; E05B 85/16; Y10T 292/57; Y10S 292/08; Y10S 292/22; Y10S 292/56; Y10S 292/57; Y10S 292/61; Y10S 292/65
  See application file for complete search history.

(56) References Cited

U.S. PATENT DOCUMENTS

| | | | | |
|---|---|---|---|---|
| 2010/0237634 | A1* | 9/2010 | Gandhi | E05B 77/06 292/254 |
| 2011/0115240 | A1 | 5/2011 | Muller et al. | |
| 2011/0156412 | A1* | 6/2011 | Savant | E05B 77/06 292/336.3 |
| 2014/0312633 | A1* | 10/2014 | Ilardo | E05B 77/06 292/336.3 |

FOREIGN PATENT DOCUMENTS

| | | | |
|---|---|---|---|
| JP | 07218043 A * | 8/1995 | |
| WO | 2008/068259 A1 | 6/2008 | |
| WO | 2008/068262 A1 | 6/2008 | |

* cited by examiner

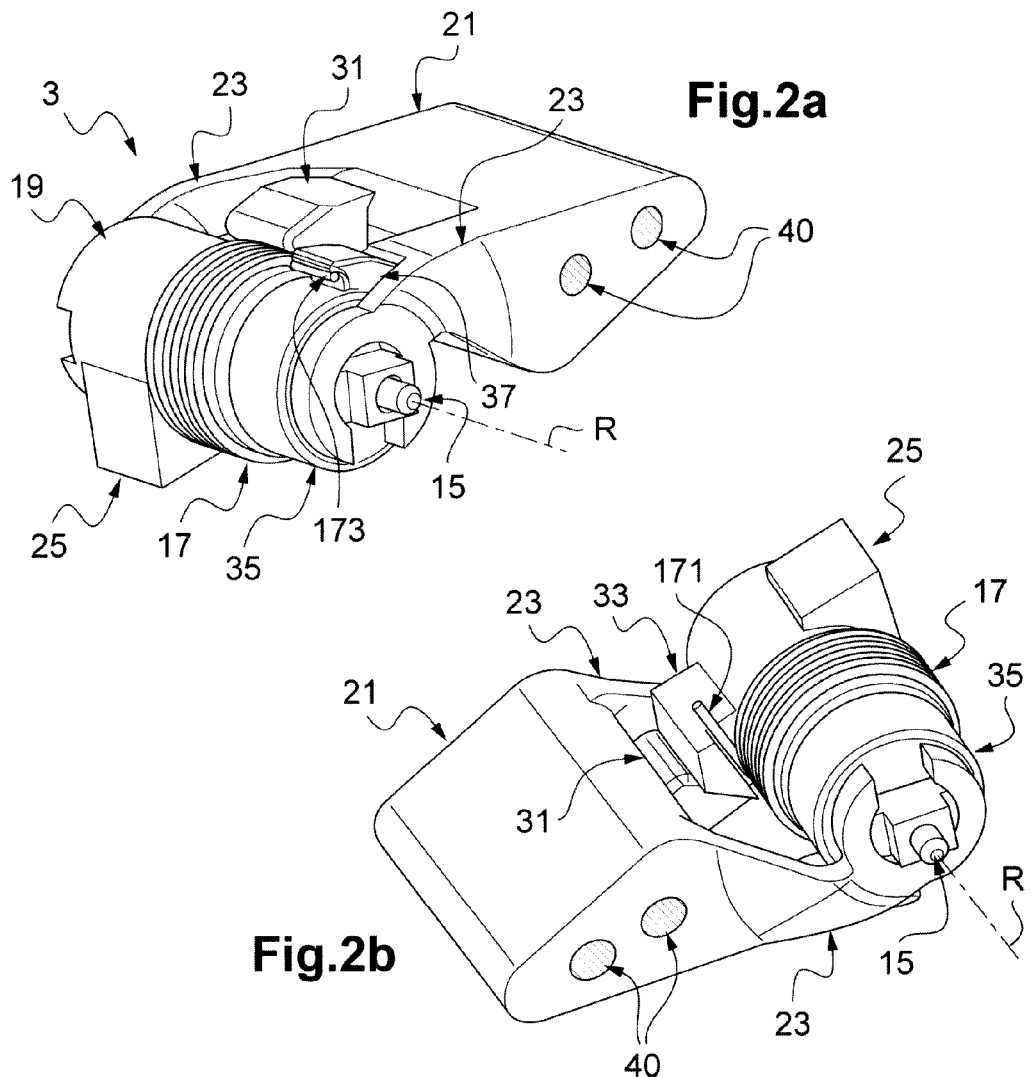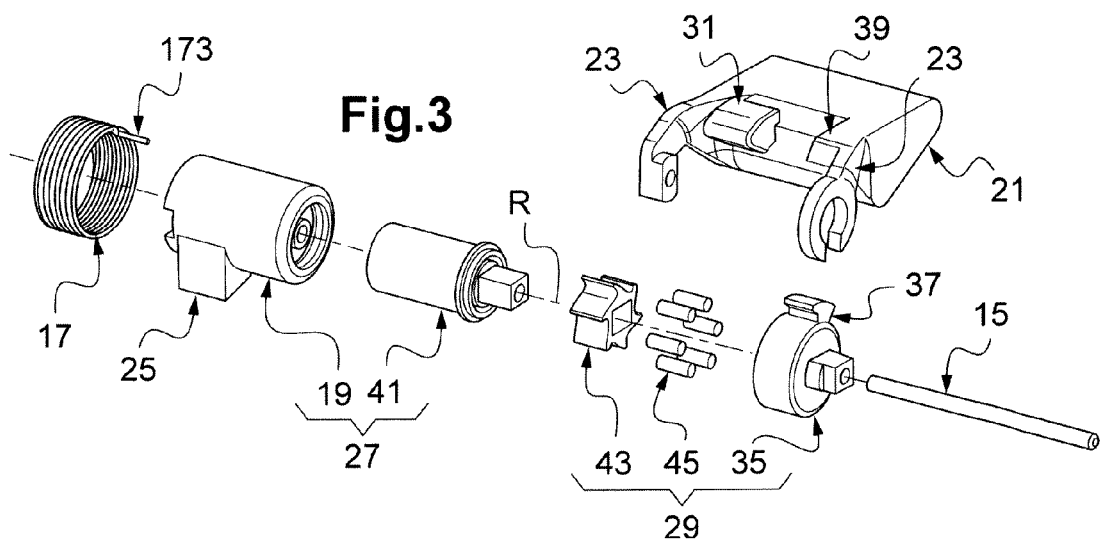

Fig.4
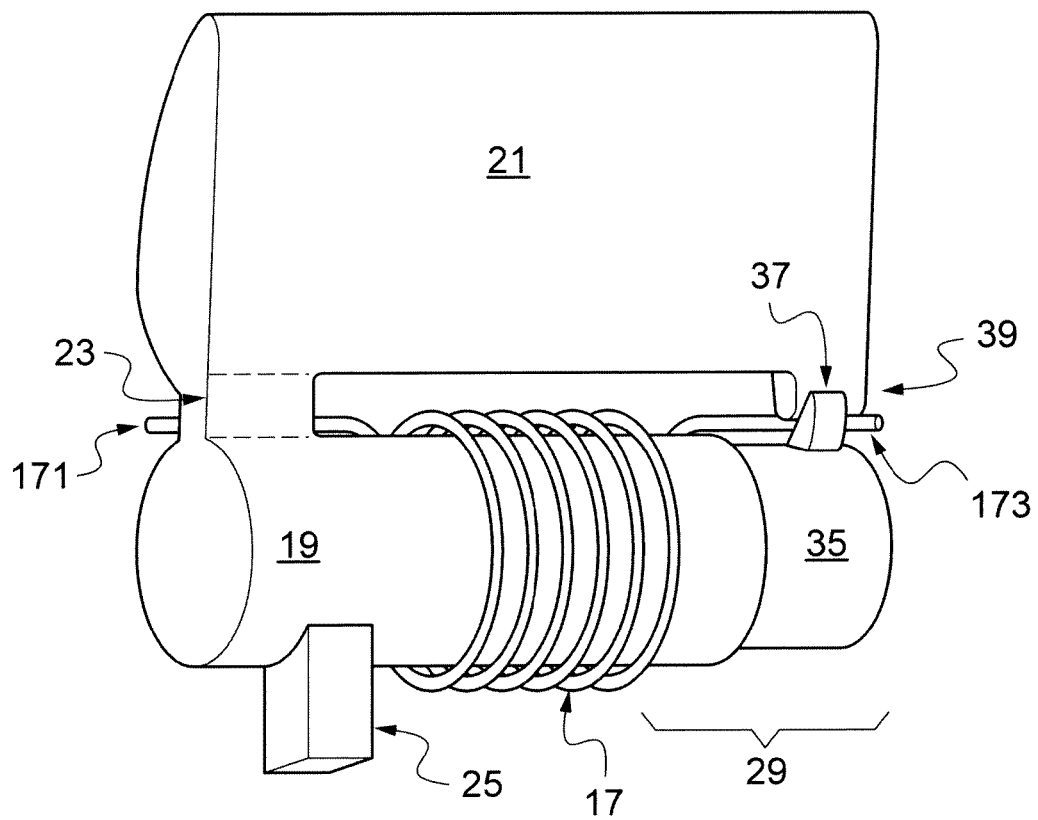
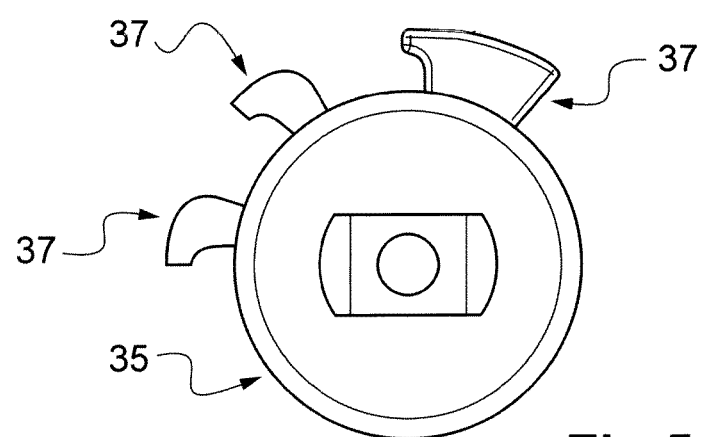
Fig.5

SAFETY DEVICE FOR VEHICLE DOOR HANDLE

CROSS-REFERENCE TO RELATED APPLICATIONS

This application is a National Stage application of International Patent Application No. PCT/EP2013/065251, filed on Jul. 18, 2013, which claims priority to European Patent Application No. 12425126.5, filed on Jul. 18, 2012. Both applications are hereby incorporated by reference in their entirety.

BACKGROUND

The invention relates to a safety device for a vehicle door handle, in particular in order to avoid unsolicited opening of said door during a side crash scenario.

When a vehicle undergoes a lateral collision, the inertia of the handle pieces can lead to an actuation of the door latch. Major risk in that case is the opening of the door, meaning that the occupants are directly exposed to the outside, while free objects can be thrown out of the vehicle.

It is known to use movement prevention devices, actuated by the important accelerations often of several tens of g that lock the handle to avoid opening of the vehicle door. Most commonly, said movement prevention devices use an inertial mass which is moved by inertia so as to enter a blocking position. In said blocking position, blocking means engage with the latch or handle mechanics in a way that prevents opening of the door.

The known movement prevention devices can be divided in two main categories: temporary blocking and permanent blocking. The temporary blocking devices use returning means such as a spring to bring back the inertial mass in a non-blocking position as soon as the acceleration diminishes beyond a predetermined value. The permanent blocking devices have no means to bring back the inertial mass in the non-blocking position, and often comprise in addition means to keep the blocking means engaged with the latch or handle mechanics even after the crash subsequent accelerations are gone.

The temporary blocking devices ensure that a rescuer or anyone wishing to activate the door handle can open the door from outside once the vehicle has stabilized itself for pulling the occupants of the vehicle out. The problem with said temporary blocking devices is that vibrations and the inertia oscillations due to rebounds of the vehicle or to secondary impacts are likely to free the blocking means of the movement blocking device from the handle mechanism.

Permanent blocking devices are more effective in keeping the door closed during the crash, but the latches or handles remain blocked in locked state even when the doors could be opened safely again.

Damped inertial systems use a temporary blocking architecture, in which a rotational damper selectively delays the return to the non-blocking position of the movement prevention device. Movement prevention devices using damped inertial systems combine the advantages of both permanent and temporary blocking devices. During the crash, the movement prevention device is maintained in blocking position during the risk time interval, and returns to non-blocking position afterwards, allowing easy evacuation of the vehicle.

The inertial systems must conform to specific requirements and scope statements, that may differ from one country to another. Also, the involved door handle pieces may vary from one vehicle model to another, in particular the mobile part of the handle and its weight. Consequently, various models of inertial systems have to be developed and distributed, tuned specifically for a particular door handle model.

This lack of uniformity leads to additional expenses in that the inertial systems cannot be produced in very high numbers, which reduces the individual price of the individual inertial systems. This also increases the logistic complexity, as the different inertial systems must be delivered to the different production sites of each corresponding vehicle type.

SUMMARY

In order to overcome at least partially the aforementioned drawbacks, the invention has for object an inertial system for a vehicle door handle, comprising:
  an inertial mass, driven by inertia from a rest position in which the opening of the door is authorized, to a blocking position in which the opening of the door is blocked,
  blocking means configured to prevent opening of the door when the inertial mass is in blocking position,
  elastic means, being in a minimal tensile stress state when the inertial mass is in rest position, and configured to apply a force or torque on the inertial mass to bring said inertial mass from the blocking position back in rest position,
  wherein it further comprises a preloading mechanism intended to cooperate with the elastic means, and configured so that it comprises at least two possible preloading states enabling the elastic means to have different minimal tensile stress states.

By modifying the tensile stress state of the elastic means by use of the preloading mechanism, such an inertial system can be adapted to various door handle configurations while being implemented, in particular to various inertial mass configurations.

The inertial system may also comprise one or more of the following features, taken separately or in combination.

The preloading mechanism comprises at least one protrusion and/or recess intended to receive a part of the elastic means.

The preloading mechanism is associated with a free wheel cap, rotationally mobile with respect to a cylindrical body carrying the blocking means.

The elastic means comprise a coil spring, one free end being attached to a cylindrical body carrying the blocking means, and the second free end being attached to the preloading mechanism wherein the tensile stress state of the coil spring is defined by the relative position of two free ends of said coil spring.

The inertial mass comprises a second shoulder, a cylindrical body carrying the blocking means and the inertial mass are coupled in rotation in direction of the blocking position, and a part of the preloading mechanism, especially the radial protrusion and the second shoulder are configured to define the rest position when leaning on each other.

It further comprises a rotational damper, configured to apply a force or torque opposing the force or torque of the elastic means when the inertial mass is returning to rest position, connected on one hand to the cylindrical body, and on the other hand to the free wheel cap.

The inertial mass comprises a socket in which an additional weight can be inserted.

The invention also relates to a door handle comprising an inertial system as described.

The invention furthermore relates to the associated method to assemble a door handle comprising an inertial system as described, with the steps:
- the preloading mechanism is disposed according to a chosen preloading state,
- the preloading mechanism is installed in the door handle in such way that the elastic means are preloaded according to the defined preloading state.

In particular a preassembling of the inertial system may take place at a work station different from where the switching to a chosen preloading state and the installation of the preloading mechanism take place.

DESCRIPTION OF THE DRAWINGS

Other features and advantages will appear at the reading of the following description of the surrounded figures, among which:

FIGS. 2a and 2b are respectively top and bottom views of one embodiment of the inertial system, FIG. 3 is an exploded view of the inertial system of FIGS. 2a, 2b, FIG. 4 is a schematic view of a second, simpler embodiment of an inertial system according to the invention, FIG. 5 is a schematic view of a free wheel cap in an embodiment of an inertial system according to the invention.

DETAILED DESCRIPTION

Figure 1:
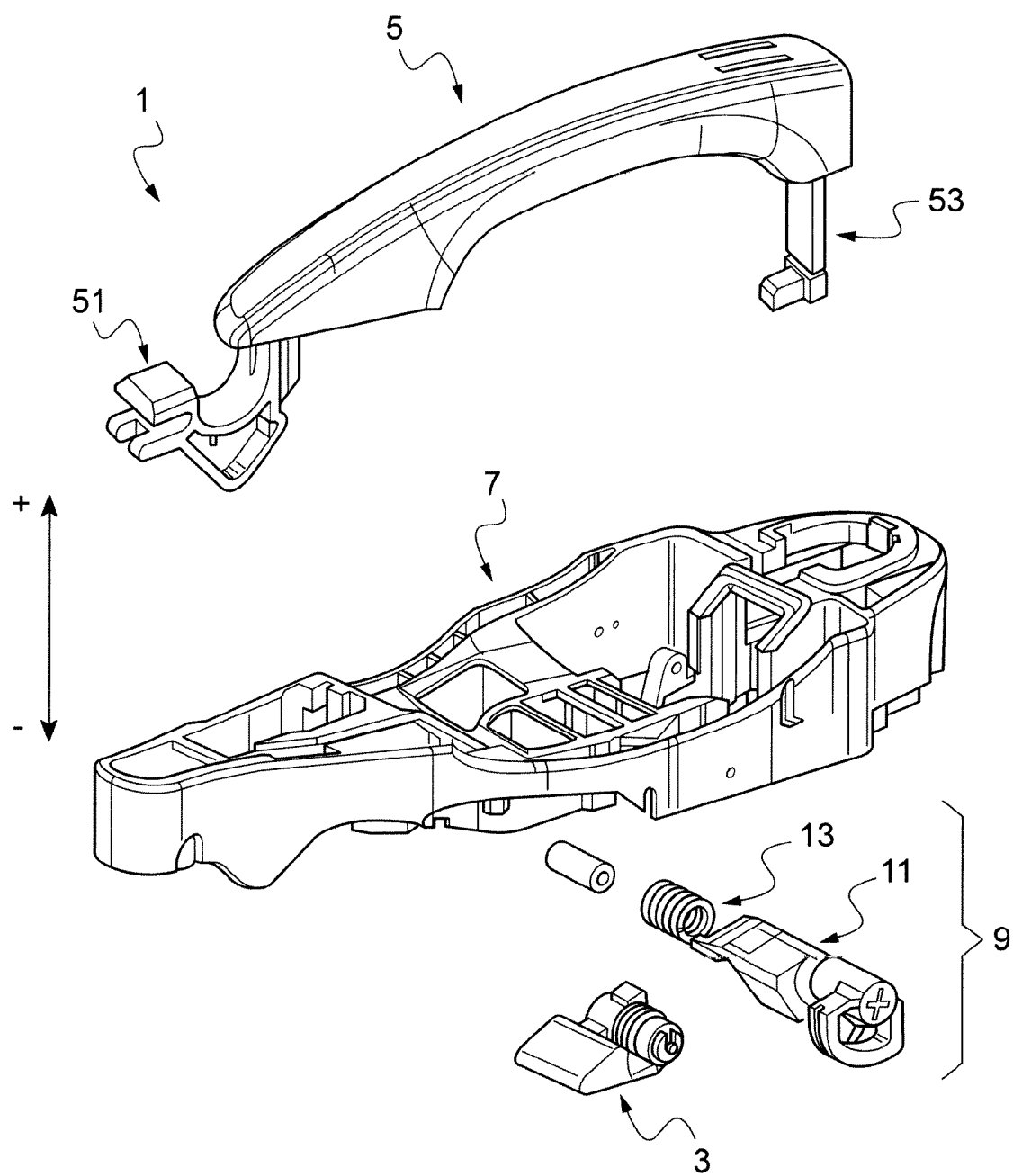
FIG. 1 is an exploded view of a door handle comprising an inertial system according to the invention.

On all figures, the same references relate to the same elements.

On FIG. 1 are shown the different elements of a vehicle door handle 1 comprising an inertial system 3 according to the invention.

The handle 1 comprises a lever 5, mounted mobile in a bracket 7. The lever 5 is placed on the outside of the vehicle door, and is actuated by the user to open the handle 1, for example by rotation of the lever 5 around an articulation in a lever swan neck 51. This lever comprises on opposed ends a swan neck 51 and a lever column 53.

The handle 1 comprises a handle mechanism 9, said handle mechanism 9 comprises in the embodiment here depicted a main lever 11, a lever spring 13, here a coil spring and the inertial system 3.

The handle mechanism 9 is incorporated in the bracket 7. When the user actuates the lever 5, the lever column 53 sets the main lever 11 in motion. The main lever 11 in turn actuates a latch mechanism on vehicle door side.

One particular embodiment of the inertial system 3 is shown in a more detailed fashion in FIGS. 2a, 2b and 3. FIG. 2a is a top view of the assembled inertial system 3, FIG. 2b is a bottom view of said assembled inertial system 3. FIG. 3 is an exploded view of the inertial system.

The inertial system 3 comprises an inertial system shaft 15 around which the rotational movements are done, and elastic means 17, here in form of a coil spring.

The inertial system 3 comprises a cylindrical body 19 hinged to the inertial shaft 15 around a rotation axis R, and a hinged inertial mass 21, hinged to the cylindrical body 19 at further end of two arms 23 and mobile in rotation around rotation axis R. To block handle 1 actuation when in a blocking position, the inertial system 3 comprises blocking means 25 to interact with the main lever 11 and the corresponding elements of the latch mechanism. The blocking means 25 are here represented in form of a pin extending radially from the cylindrical body 19.

The pin 25 can for example work by being inserted during displacement of the cylindrical body 19 in an element of the latch mechanism, such as a slit to block translational movement of a rod of the latch mechanism. As an alternative, the pin 25 may interfere with a gear by blocking the rotation of said gear. In the discussed embodiment, the pin 25 blocks the movement of the main lever 11 when the mass 21 is in blocking position by blocking the rotation of said main lever 11.

This allows to distinguish two positions of the inertial mass 21: a rest position in which the opening of the door is authorized, to which the mass 21 returns in absence of actuation, and a blocking position, in which the opening of the door is blocked, and to which the mass 21 is driven by the inertial forces in case of a crash.

The inertial system also comprises a damper 27 (integrated in body 19 and therefore not visible on FIGS. 2a, 2b, but on FIG. 3) configured to temporize the return to rest position of the hinged mass 21 by exerting a force or torque opposing that of the elastic means 17 and a preloading mechanism 29, intended to cooperate with the elastic means 17 by adjusting the load of said elastic means 17 independently of the position of the hinged mass 21.

The damper 27 may for example be a friction damper, based on friction of two parts to create the torque or force, or a fluid circulation damper, based on rheological circulation of a fluid to create the torque or force.

As shown on FIG. 3, the damper 27 comprises a friction tube 41, said friction tube 41 engages in friction against the inner wall of the cylindrical body 19 when inserted in said cylindrical body 19, and forms a stationary part of the damper, the cylindrical body 19 forming the mobile part. The material of the contacting surfaces may be chosen in accordance with the desired friction coefficient and behavior.

The preloading mechanism 29 (also more visible on FIG. 3) comprises the aforementioned free wheel cap 35, a free wheel rotor 43, and free wheel cylinders 45. The free wheel rotor 43 is in particular shaped so as to let the cylinders 4 5 roll against an inner wall of the free wheel cap 35 in the permitted rotation direction (in direction of the blocking position) with minimal friction forces, and to force the cylinder 45 radially outwards against said inner wall so as to engage in friction and prevent rotation in the other direction (known as free wheel blocking mechanism).

The free wheel rotor 43 is fastened to the friction tube 41, here by means of an axial rod on one end of the tube 41, which is inserted in a hole of matching form in the rotor 43.

Other unidirectional blocking mechanisms may be used, such as for example a gear and pawl ratchet blocker.

The elastic means 17 store elastic potential energy by undergoing tensile stress when the inertial mass 21 is driven in blocking position by the inertial forces, for example when the vehicle is undergoing lateral accelerations due to a side impact. In the case of a coil spring the tensile stress state is bound to the relative position of the two free ends of said coil spring 17, be it in rotation (case of a torsion coil spring) or in compression/elongation (case of a linear coil spring).

In the case of a coil spring 17 surrounding the cylindrical body 19 of a rotational inertial system 3 as previously discussed, the elastic potential energy is stored by torsion of the coil spring 17 starting from a minimal tensile stress state, reached when the inertial system 3 is in rest position. In particular, the coil spring 17 dissipates the stored elastic potential energy by creating a force or torque that drives the inertial mass 21 back to rest position.

The hinged inertial mass 21 and the cylindrical body 19 comprise two shoulders 31, 33, respectively on the mass 21 and on the cylindrical body 19. In the rest position of the hinged inertial mass 21, the two shoulders 31, 33 lean on each other. From said rest position, if the hinged inertial mass 21 is displaced in direction of the blocking position, the shoulder 31 on the mass 21 pushes the shoulder 33 on the cylindrical body 19, thus driving the cylindrical body 19 and consequently the blocking means 25 in blocking position. In the other direction, the shoulders 31, 33 dissociate and the movement of the hinged mass 21 is independent from that of the cylindrical body 19.

The two shoulders 31, 33 allow selective coupling in the direction of the blocking position of the rotational movements of cylindrical body 19 and hinged mass 21.

This has in particular for effect that inertial forces or torques that bring the inertial mass 21 back in rest position do not drive indirectly the cylindrical body 19 back in rest position. Said cylindrical body 19 only undergoes the forces or torques of the elastic means 17 and of the damper 27, thus returning in a temporized way back to rest position.

Consequently, the forces or torques resulting from a secondary rebound (on a tree or boardwalk, or due to a rollover) that may otherwise drive the damped inertial system 3 back in rest position while the crash is still happening only act on the inertial mass 21, and not on the cylindrical body 19, which carries the blocking means 25.

The free wheel cap 35 of the preloading mechanism 29 comprises in particular a radial protrusion 37.

The radial protrusion 37 cooperates with a corresponding second shoulder 39 of the hinged mass 21. The radial protrusion 37 and second shoulder 39 define, when leaning on each other, the rest position of the hinged inertial mass 21 with respect to the free wheel cap 35, and thus with respect to the bracket 7 to which the free wheel cap is solidly attached in mounted state.

One free end 171 of the coil spring 17 is attached to the cylindrical body 19 by being hooked to the shoulder 33, the second free end 173 is attached to the free wheel cap 35 by being hooked to the radial protrusion 37. As an alternative, the preloading mechanism 29, in particular its free wheel cap 35 may comprise notches or more generally recesses to receive a part, for example the free end 173, of the elastic means instead or additionally to the protrusion 37.

The rotational position of the free wheel cap 35 with respect to the cylindrical body 19 thus defines the tensile stress state of the coil spring 17. In particular, the coil spring 17 therefore creates a force or torque that tends to drive the cylindrical body 19 in a relative zero position, where the tensile stress of the coil spring 17 is in preloaded condition by design.

However, the presence of the two shoulders 31 and 39 of the hinged mass 21 does not allow rotations by a greater angle than approximately 360° (complete rotation), as well as rotations in one direction when in rest position, thus defining a maximal use angular domain, which extends from the rest position in direction of the blocking position, until the position in which the shoulders 31, 39 of the hinged mass 21 hit the shoulder 33 of the cylindrical body 19 and the radial protrusion 37.

In absence of hinged mass 21, the cylindrical body 19 can be rotated freely, in particular by an integer number of complete rotations. Therefore, the rest position due to the presence of the shoulders 31, 33, 39 and the radial protrusion 37 when implementing the hinged mass 21 is defined modulo an integer number of rotations.

This number of rotations corresponds to the minimal tensile stress of the elastic means 17, reached when the inertial mass 21, the cylindrical body 19 and the preloading mechanism 29 are in relative rest position. By increasing the number of rotations, a higher minimal tensile stress state is reached, while by decreasing the number of rotations a lower minimal tensile stress state is reached.

As explained, the movement of the mass 21 in direction of the blocking position causes the elastic means 17 to store potential elastic energy in form of tensile stress, the elastic means 19 being in a state of minimal tensile stress when the inertial mass 21 is in the rest position. The elastic means 17 bring the mass 21 back in rest position by returning to their state of minimal tensile stress.

A higher tensile stress in rest position implies that the elastic means 17 apply a higher torque or force on the cylindrical body 19 during the movements. This higher torque or force brings in particular the inertial mass 21 back to rest position faster.

The preloading mechanism 29 is switchable between various preloading states, corresponding here to the integer number of rotations in minimal tensile stress state. In the different preloading states the load of the elastic means 17 is different at same inertial mass 21 position. In particular, the minimal tensile stress state, reached in rest position, is changed.

This tuning of the time taken by the inertial mass 23 to return to rest position and thus free the bracket kinematics as well as the latch mechanism allows to tune the duration of the locking state in which the inertial system 3 is brought in case of crash.

Further tuning of the characteristics of the inertial system is allowed by the presence of sockets 40, drilled or milled in the inertial mass 21. In particular, a pin (not represented) of specific weight can be inserted in the sockets 40 to adjust the weight of the inertial mass 21. As an alternative, a solidifying, initially liquid or soft matter can be injected in said sockets 40, and then left to harden inside of it.

FIG. 4 shows an embodiment of a not damped reversible inertial system, comprising a preloading mechanism 29 according to the invention. In this embodiment, the inertial system 3 comprises a cylindrical body 19 carrying blocking means 25, an inertial mass 21 and an arm 23, fastened together, possibly formed as one piece.

The preloading mechanism 29 comprises a free wheel cap 35, rotationally mobile with respect to the cylindrical body 19, and fastened to the bracket in mounted state. The free wheel cap 3 5 comprises a 20 radial protrusion 37, and the mass 21 comprises a second shoulder 39. In rest position, the radial protrusion 37 and the second shoulder 39 lean on each other, limiting the reachable domain to an angular aperture smaller than a complete rotation (360°).

The elastic means comprise here a torsion coil spring 17 surrounding the cylindrical body 19, one free end 171 of the coil spring 17 is attached to the cylindrical body 19 by being hooked to the arm 23, the second free end 173 is attached to the free wheel cap 35 by being hooked to the radial protrusion 37.

In this embodiment, the preloading of the elastic means 17 is done when inserting the free wheel cap 35. While maintaining the inertial mass 21 and the free wheel cap 35 in a relative position where the radial protrusion 37 and the second shoulder 39 do not cooperate to stop the rotation when reaching the rest position, the free wheel cap 35 is rotated by an integer number of rotations with respect to the cylindrical body 19. At implementation, the free wheel cap 35 is fastened to the bracket 7, and brought in a relative position where the radial protrusion 37 and the second shoulder 39 cooperate to stop the rotation movement when reaching rest position.

The number of rotations defines the minimal tensile stress state of the elastic means 17 in that the radial protrusion 37 and second shoulder 39 prevent the cylindrical body 19 from rotating by more than a given angle smaller than 360°, thus preventing the release of all the tensile stress.

This embodiment is in particular simpler and potentially cheaper than the embodiment of FIGS. 2a, 2b and 3, but is neither damped nor having a mass 21 selectively uncoupled from the cylindrical body 19.

FIG. 5 shows an alternative design of the free wheel cap 35 of FIGS. 1, 2a, 2b, and 3 in which said cap 35 comprises several radial protrusions 37. These radial protrusions are regularly placed along a circle arc centered on the rotation axis R around which the mass 23 rotates. The free end of the elastic means 19 is in particular attached selectively to one of said protrusions 37 to obtain a predetermined tensile stress state of the elastic means 19 at same inertial mass 23 position.

In the represented embodiment, the protrusions 37 are three, regularly placed on an arc of 60° approximately. Following the direction of the coil spring 17 winding, the three protrusions correspond respectively to a state of lower tensile stress, of medium tensile stress and of important tensile stress.

The presence of a preloading mechanism 29 allows in particular to tune more precisely the time in which the inertial mass 23 returns to rest position, after the production and at least partial assembling of the inertial system 3.

Therefore, a single model of inertial system 3 can be tuned to match different models of handles 1, with a wide panel of lever 5 weights and forms.

Furthermore, in the embodiment of FIGS. 1, 2a, 2b and 3, the inertial system 3 forms a compact unit. In particular, the assembling and adjusting of the inertial system 3 can be performed at a different work station from the one where the final implementation of the inertial system 3 in the bracket 7 takes place. In particular, the assembled and adjusted inertial system 3 can be transported from one work station to the other as it is one compact unit which can be handled easily, for example to perform the preloading.

The assembling of a vehicle door handle 1 comprising an inertial system 3 as previously described therefore comprises an additional step of setting the preloading mechanism protrusion 37 so as to reach a required tensile stress state of the elastic means 17 allowing return to rest position and engagement times of the blocking means 25.

This step of setting the preloading mechanism protrusion 37 preferentially takes place just before the hinging of the inertial mass 21 in the case of the embodiment of FIGS. 2a, 2b and 3, and more generally just before mounting the inertial system 3 in the door bracket 7. In particular, the same model of inertial systems 3 can be preassembled, and then shipped to different bracket 7 manufacturers, who perform themselves the settings of the inertial systems 3 to match the required behavior of the inertial systems 3 and final assembling.

The invention claimed is:

1. An inertial system for a vehicle door handle of a door, said inertial system comprising:
    an inertial mass driven by inertia from a rest position, in which opening of the door by the vehicle door handle is permitted, to a blocking position, in which opening of the door by the vehicle door handle is not permitted;
    a blocking means that prevents the opening of the door by the vehicle door handle when the inertial mass is in the blocking position; and
    an elastic means being in a minimal tensile stress state when the inertial mass is in the rest position and applies a force on the inertial mass to bring the inertial mass from the blocking position to the rest position,
    wherein the inertial system further comprises a preloading mechanism that cooperates with the elastic means and includes at least two preloading states for changing the minimal tensile stress state of the elastic means.

2. The inertial system according to claim 1, wherein the preloading mechanism comprises at least one protrusion that receives a part of the elastic means.

3. The inertial system according to claim 1, wherein the preloading mechanism comprising a free wheel cap that is rotationally mobile with respect to a cylindrical body carrying the blocking means.

4. The inertial system according to claim 1, wherein the elastic means comprises a coil spring having a first free end attached to a cylindrical body carrying the blocking means and a second free end attached to the preloading mechanism, wherein the minimal tensile stress state of the coil spring is defined by a relative position of the first and second free ends of said coil spring.

5. The inertial system according to claim 2, wherein the inertial mass comprises a shoulder such that a cylindrical body carrying the blocking means and the inertial mass are rotationally coupled in a direction of the blocking position, and the at least one protrusion and a second shoulder of the inertial mass define the rest position when leaning on each other.

6. The inertial system according to claim 5, further comprising a rotational damper that applies a force opposing the force of the elastic means when the inertial mass is returning to rest position, the rotation damper is connected to the cylindrical body and to a free wheel cap.

7. The inertial system according to claim 1, wherein the inertial mass comprises a socket in which an additional weight can be inserted.

8. A vehicle door handle, comprising:
    a lever; and
    an inertial system, wherein the inertial system comprises:
        an inertial mass driven by inertia from a rest position, in which opening of the door by the lever is permitted, to a blocking position, in which opening of the door by the lever is not permitted;
        a blocking means that prevents the opening of the door by the lever when the inertial mass is in the blocking position;
        an elastic means being in a minimal tensile stress state when the inertial mass is in the rest position and applies a force on the inertial mass to bring the inertial mass from the blocking position to the rest position; and
        a preloading mechanism that cooperates with the elastic means and including at least two preloading states for changing the minimal tensile stress state of the elastic means.

9. A method to assemble a vehicle door handle, the handle comprising an inertial system according to claim 1, the method comprising:
    disposing the preloading mechanism according to a chosen preloading state of said at least two preloading states; and installing the preloading mechanism in the vehicle door handle such that the elastic means is preloaded according to the chosen preloading state.

10. The inertial system according to claim 2, wherein the preloading mechanism comprises a free wheel cap that is rotationally mobile with respect to a cylindrical body carrying the blocking means.

11. The inertial system according to claim 2, wherein the elastic means comprises a coil spring having a first free end attached to a cylindrical body carrying the blocking means and a second free end attached to the preloading mechanism, wherein the minimal tensile stress state of the coil spring is defined by a relative position of the first and second free ends of said coil spring.

12. The inertial system according to claim 3, wherein the elastic means comprises a coil spring having a first free end attached to a cylindrical body carrying the blocking means and a second free end attached to the preloading mechanism, wherein the minimal tensile stress state of the coil spring is defined by a relative position of the first and second free ends of said coil spring.

13. The inertial system according to claim 3, wherein the inertial mass comprises a shoulder such that a cylindrical body carrying the blocking means and the inertial mass are rotationally coupled in a direction of the blocking position, and the at least one protrusion and a second shoulder of the inertial mass define the rest position when leaning on each other.

14. The inertial system according to claim 4, wherein the inertial mass comprises a shoulder such that a cylindrical body carrying the blocking means and the inertial mass are rotationally coupled in a direction of the blocking position, and the at least one protrusion and a second shoulder of the inertial mass define the rest position when leaning on each other.

15. The inertial system according to claim 2, wherein the inertial mass comprises a socket in which an additional weight can be inserted.

16. The inertial system according to claim 3, wherein the inertial mass comprises a socket in which an additional weight can be inserted.

17. The inertial system according to claim 4, wherein the inertial mass comprises a socket in which an additional weight can be inserted.

18. The inertial system according to claim 5, wherein the inertial mass comprises a socket in which an additional weight can be inserted.

19. The inertial system according to claim 6, wherein the inertial mass comprises a socket in which an additional weight can be inserted.

* * * * *